Figure 1:
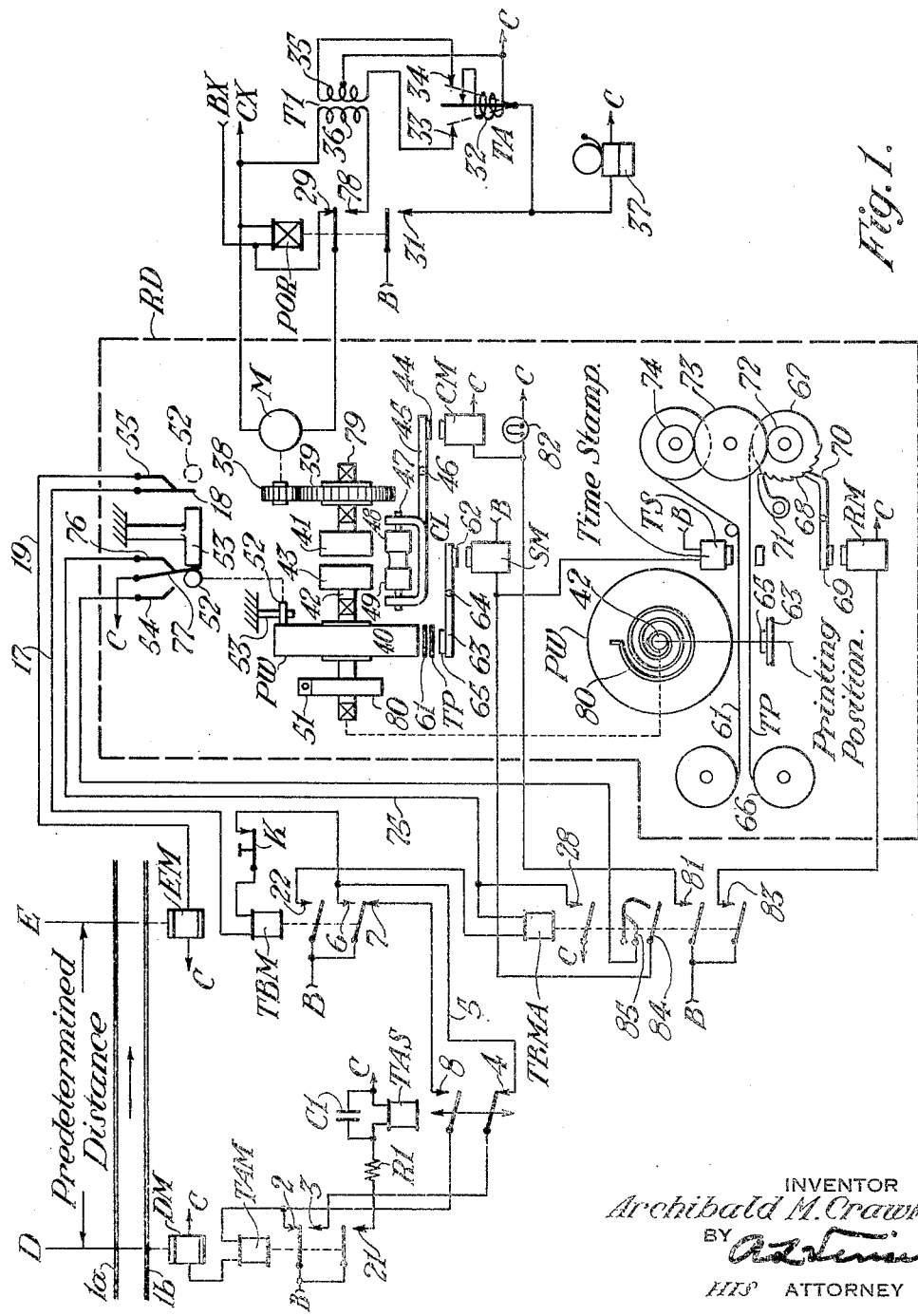

Patented July 3, 1945

2,379,686

UNITED STATES PATENT OFFICE 2,379,686

SPEED MEASURING AND RECORDING APPARATUS

Archibald M. Crawford, Pittsburgh, Pa., assignor to The Union Switch and Signal Company, Swissvale, Pa., a corporation of Pennsylvania Application May 12, 1943, Serial No. 486,725

2 Claims. (Cl. 234—29.5)

My invention relates to speed measuring and recording apparatus, and more particularly to apparatus located along a vehicle trackway to measure and record the speed of a passing vehicle.

An object of my invention is the provision of novel and improved wayside apparatus for automatically measuring and recording the speed of a vehicle as it traverses a preselected section of its trackway.

Another object of my invention is the provision of novel vehicle controlled apparatus for printing on a tape in miles per hour or other suitable speed unit the speed of a vehicle traversing a preselected section of its trackway.

Other objects, features and advantages of my invention will appear as the specification progresses.

In accordance with the present invention, the speed of a vehicle is measured by moving a member at a preselected uniform rate during the time interval between the entrance of the vehicle into a trackway section of a predetermined length and the exit of the vehicle from such section. That is, this member is primarily a time indicator and indicates by the distance moved the time interval required for a vehicle to travel a predetermined distance. Both time and distance are direct factors in determining the speed of a vehicle, and hence such a member may be calibrated so as to indicate speed directly since the distance traveled by the vehicle is a fixed distance. This member is operatively associated with a series of miles per hour numerals or similar speed unit characters, which are disposed for the member to select by its movement the numerals or characters, one after the other, with each numeral or character being selected in the time interval required by a vehicle to travel the fixed distance at the corresponding speed. A tape is disposed for printing engagement with the selected speed unit character and a magnet when energized presses the tape and selected speed unit character into printing engagement to print on the tape the speed of the vehicle.

In a preferred embodiment of the invention I use for this member a printing wheel, which is spring biased to an initial position and operable away from such initial position against the force of the bias spring by a suitable motor means. The motor means may be any constant speed motor such as, for example, a synchronous motor. This motor is preferably continuously running and is connected to the printing wheel through a suitable gear train and a clutch operated by a magnet. When the clutch magnet is deenergized the clutch is disconnected and the printing wheel is held at its initial position by the bias spring, but when the clutch magnet is energized the printing wheel is connected to the motor and driven through a prescribed movement, which prescribed movement is made slightly less than one revolution. The time required to drive the printing wheel through its complete movement is made to agree with the time interval required by a vehicle to travel a preselected distance at a preselected minimum speed. For vehicles moving at speeds above such minimum speed, the time required for the vehicle to travel this preselected distance is correspondingly less, and the printing wheel is driven only a corresponding portion of its complete movement. The printing wheel has a series of miles per hour numerals or similar speed unit characters formed on its outer surface and these numerals are positioned to be brought one after another, starting with the maximum speed numeral, to a printing position when the printing wheel is rotated away from its initial position. A tape and a stamping magnet are disposed adjacent the printing position and the stamping magnet is operable when energized to press the tape into printing engagement with the printing wheel numeral then occupying the printing position.

The trackway is formed with a section of a predetermined length and this section is provided with vehicle control apparatus, one form of which may include two vehicle actuated contact devices one at the entrance end and one at the exit end of the section. Control circuits governed by these contact devices energize the clutch magnet to start a movement of the printing wheel when the head end of the vehicle encounters the device at the entrance end of the section, and then energizes the stamping magnet when the head end of the vehicle encounters the device at the exit end of the section. In this way there is printed on the tape the speed in miles per hour at which the vehicle has traveled through this section. The clutch magnet is deenergized when the vehicle leaves the measured section, and the printing wheel is restored to its initial position by the bias spring ready for a second operation. The tape is advanced one space each time a movement of the printing wheel is initiated to bring a fresh place at the printing position. Preferably a time stamp of the usual commercial form is provided and governed by the stamping magnet or another magnet connected in multiple therewith to stamp the date and time of day on the same tape used to record the speed of the vehicle, and thereby provide a record that distinguishes between different vehicles.

Figure 2:
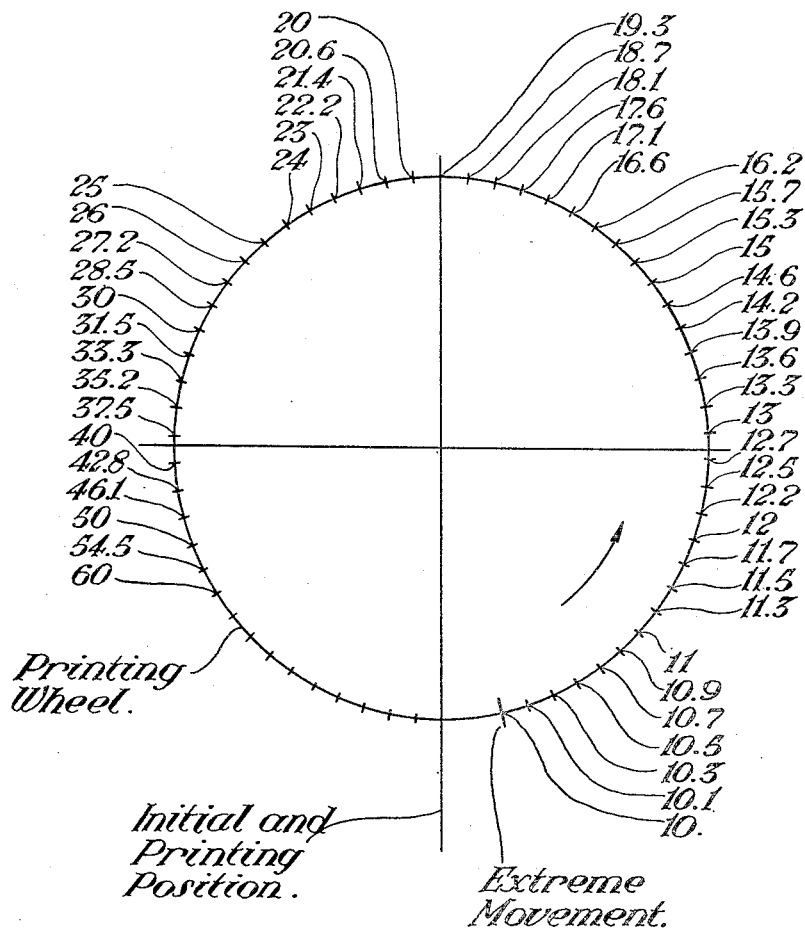

For a fuller understanding of the invention, reference may be had to the accompanying drawings, of which Fig. 1 is a diagrammatic view showing one form of apparatus embodying my invention when used to measure and record the speed of railway trains, and Fig. 2 is a diagrammatic view illustrating the manner of forming a series of miles per hour numerals on a printing wheel of Fig. 1.

I shall describe this one form of apparatus embodying my invention, and shall then point out the novel features thereof in claims.

It is to be understood, however, that my invention is not limited to railway trains, and this one use serves to illustrate the principles of the invention.

Referring to Fig. 1, the reference characters 1a and 1b designate the rails of a stretch of railway over which traffic normally moves in the direction indicated by an arrow. Two points designated D and E of the railway are preselected a predetermined distance apart. That is, the section of track D—E is of a predetermined length, location D being the entrance end of the section and location E being the exit end of the section with respect to the normal direction of traffic.

Two vehicle actuated contact devices DM and EM are placed at locations D and E, respectively. These contact devices are preferably alike, and may take any one of several well-known forms of devices having a contact actuated by a passing train. For example, these devices may be track instruments of the microphone type disclosed in Letters Patent of the United States, No. 1,834,077, granted to A. J. Sorensen, on December 1, 1931, or of the mercury contact type covered by Letters Patent of the United States No. 2,076,928, granted to H. G. Witmer, April 13, 1937, for Circuit controlling instruments. It is sufficient for this application to point out that each device DM and EM is attached to the rail and includes a contact or a circuit path that is normally closed, but which becomes open when a wheel passes the point at which the device is attached to the rail.

Two stick relays TAM and TBM are associated with devices DM and EM, respectively. Relay TAM is normally energized through a stick circuit including terminal B of a suitable source of current such as a battery not shown, front contact 2 and winding of relay TAM and the contact of track instrument DM to terminal C of the same source of current. Relay TAM is provided with a pick-up circuit that can be traced from terminal B through back contact 7 of relay TBM, front contact 8 of a relay TAS to be referred to shortly, winding of relay TAM and contact of device DM to terminal C. It follows that relay TAM is normally energized, is deenergized when a wheel of a passing train actuated device DM and is reenergized only when relay TAS is picked up, relay TBM is released and the train has passed beyond the contact device DM. Relay TBM has a pick-up circuit including terminal B, back contact 3 of relay TAM, back contact 4 of relay TAS, wire 5, a test key K, winding of relay TBM, wire 17, normally closed cutout contact 18—55 of a recording device RD to be described hereinafter, wire 19, contact of track instrument EM and terminal C; and is provide with a stick circuit extending from terminal B through its own front contact 6 to wire 5, and thence as traced for the pick-up circuit. It follows that relay TBM is normally deenergized, is energized when a train enters section D—E to release relay TAM, providing the recording device RD is positioned to close contact 18—55, and is again deenergized when a train passes location E to actuate device EM.

Relay TAS, referred to previously, is energized by an obvious circuit including back contact 21 of relay TAM, and a resistor R1 in series with the winding of relay TAS and a condenser C1 in multiple. Resistor R1 and condenser C1 are proportioned to make relay TAS slightly slow to pick up and very slow to release.

The apparatus also includes a control relay TBMA which is energized by means of a pick-up circuit extending from terminal B through front contact 22 of relay TBM, winding of relay TBMA, wire 75, and a check contact 76—77 of the recording device RD to terminal C. A front contact 28 of relay TBMA serves to shunt the check contact 76—77 so that relay TBMA once picked up, is retained energized subsequent to the opening of the check contact 76—77.

These several aforementioned relays governed by traffic passing through section D—E govern in turn control circuits for operating the recording device RD in a manner to be pointed out when the operation of the apparatus is described.

The recording device RD is indicated as a whole by dash lines, and the device comprises as essential elements, a motor M, a clutch CL, a printing wheel PW, a tape TP, a stamping magnet SM and a time stamp TS.

Motor M is preferably a continuously running synchronous motor which is supplied with alternating current either from a normal source having terminals BX and CX, or from a stand-by source including a tuned alternator TA operated by current from the battery having terminals B and C. As long as the source BX—CX is active a power-off relay POR is energized to close front contact 29 and connect motor M to this normal source. Failure of the BX—CX current source denergizes relay POR and that relay is released to close back contacts 78 and 31. The closing of back contacts 31 completes a circuit to supply direct current from the battery to an operating winding 32 of the tuned alternator TA, causing the alternator to be operated to alternately close contacts 33 and 34, so that direct current is alternately supplied to the two portions of primary 35 of a transformer T1 and an alternating current is created in secondary winding 36 of the transformer, such alternating current being of the same frequency as the source BX—CX. Motor M is connected to the secondary winding 36 through back contact 78 of the power-off relay, and motor M is operated by the alternating current thus created in secondary winding 36 when the normal source of alternating current fails. A bell 37 is controlled by relay POR when released to provide an audible indication of the failure of the normal source of alternating current.

Motor M is connected to the printing wheel PW through a gear train and clutch CL. The gear train includes a first gear 38 secured to the motor shaft and a final gear 39 secured to a shaft 79. Clutch CL may be of any suitable type, and is disclosed as a friction clutch operated by a magnet CM. A first drum 41 of the clutch is secured to shaft 79 to be continuously rotated as long as motor M is operated. A second drum 43 of the clutch is disposed adjacent drum 41 and is secured to a shaft 42 aligned with shaft 79 and having keyed thereto the printing wheel PW. Magnet CM is provided with an armature 44 carried on one end of an arm 45 pivoted at 46. The other end of arm 45 carries a roller 47 having surfaces 48 and 49 to engage drums 41 and 43, respectively. When magnet CM is deenergized, the arm 45 is gravity biased to lower the roller 47 out of engagement with drums 41 and 43, and the clutch is disengaged. When magnet CM is energized to attract its armature 44, the roller 47 is raised for surfaces 48 and 49 to engage drums 41 and 43 and drum 43 along with shaft 42 and wheel PW are rotated in response to operation of the motor M. A coil spring 80 has its outer end secured at 51 and its inner end secured to shaft 42 to bias shaft 42 and printing wheel PW to an initial position where a pin 52 mounted in wheel PW engages a fixed stop pin 53. Thus when clutch CL is disengaged, the printing wheel PW is rotated to this initial position due to the force of spring 80, but when magnet CM is energized to engage clutch CL, the printing wheel is rotated away from the initial position against the force of spring 80 due to the operation of motor M. It is to be observed that there is little or no delay in the starting of the movement of the printing wheel PW subsequent to the energizing of clutch magnet CM because the motor M is continuously running.

Printing wheel PW is limited to a movement of substantially one revolution due to stop pin 52 engaging the opposite side of the fixed pin 53 when the wheel has made substantially one revolution. The parts are proportioned for wheel PW to be operated from its initial position to its extreme position in a predetermined time interval such as, for example, one minute. It is apparent that if clutch magnet CM becomes deenergized at any time during a movement of the printing wheel PW by motor M, the wheel is at once returned from the position to which it has been moved to its initial position by the force of bias spring 80.

As illustrated at the top portion of Fig. 1, pin 52 is also used to actuate circuit controlling contacts according to the position of the printing wheel. At the initial position the pin 52 occupies the position at the left as viewed in the drawing of the fixed pin 53 and where it engages a fixed contact member 77 to force this member into engagement with a fixed contact 76 and completes a circuit connection between contacts 77 and 76, the contact 76—77 serving as a check contact at the initial position of wheel PW. As pin 52 moves to the left as viewed in the drawing, due to operation of the wheel away from its initial position, contact member 77 is biased by its own spring action out of engagement with contact 76 and into engagement with another fixed contact 54 to complete a circuit contact 77—54. When printing wheel PW is rotated to its extreme position, pin 52 engages stop pin 53 at the right as viewed in Fig. 1 and as pin 52 approaches this extreme position it engages contact member 18 which is biased by its own spring action to normally engage contact 55 and the contact member 18 is forced out of engagement with the contact 55 to open the contact 18—55.

Printing wheel PW has a series of characters or numerals formed on its outer surface, a single numeral 40 being shown in Fig. 1 by way of illustration. These numerals represent speed in miles per hour, and the series would include numerals representing steps from a predetermined maximum speed to a predetermined minimum speed. In Fig. 2 there are illustrated the numerals that would be formed on the printing wheel when the wheel is used with a track section 880 feet in length, and a range of train speeds from a maximum of 60 miles per hour to a minimum of 10 miles per hour. In Fig. 2 the complete movement of wheel PW is represented as being of the order of 342 degrees (substantially one revolution) and the effective surface of the wheel is divided into 60 even spaces so that each space represents one second of time on the assumption that the wheel makes its complete movement in one minute. The numeral for each such space of the wheel represents speed in miles per hour to the nearest one-tenth mile, and each numeral is shown in Fig. 2 with a reference line leading to the respective space it occupies on the wheel. The printing wheel is provided with a printing position which in Fig. 2 is represented as coinciding with the initial position and illustrated as being at the bottom of the wheel on the vertical axis. Thus, assuming that the wheel rotates counterclockwise, these numerals are brought one at a time starting with the maximum numeral of 60 miles per hour, to the printing position. A vehicle moving through a track section of 880 feet in length at 60 miles per hour will require ten seconds to traverse the section. The numeral 60 is formed on the tenth space to be brought to the printing position. Consequently, if rotation of the wheel is started when the vehicle enters the section, the numeral 60 is at the printing position when the vehicle is at the exit end of the section. If the vehicle is moving at only 10 miles per hour, it requires 60 seconds to traverse the 880 foot section and the numeral 10 formed on the sixtieth space of the wheel is brought to the printing position as this vehicle reaches the exit end of the section. Similarly, each of the intervening numerals is brought to the printing position in the time required for a vehicle to travel the section at the corresponding speed.

Printing tape TP and stamping magnet SM are associated with the printing wheel PW, tape TP being disposed to cooperate with the outer surface of the wheel at the printing position. As shown in the lower portion of Fig. 1, an inked ribbon 61 is disposed between tape TP and the outer surface of the wheel PW. Stamping magnet SM is provided with an armature 62 carried on one end of an arm 63, pivoted at 64 and having a platen 65 carried on its other end in a position to be under the tape at the printing position. It is apparent that when magnet SM is energized to attract its armature 62, the platen 65 is raised to press tape TP against the miles per hour numeral of wheel PW then positioned at the printing position, and the respective numeral is printed on the tape.

Tape TP is unrolled from a roll 66 on to a roll 67 by means of a magnet RM and a ratchet 68 secured to the roll 67. When magnet RM is energized to attract its armature 69, a ratchet pawl 70 is raised and roll 67 is advanced one space, a retaining pawl 71 retaining roll 67 at this advanced space. Inked ribbon 61 is advanced one space each time tape TP is advanced by means of friction rollers 72, 73 and 74 as will be readily understood by an inspection of the lower portion of Fig. 1.

Time stamp TS is of any suitable commercial form and is shown conventionally and it is disposed to cooperate with the tape TP and the inked ribbon 61 at a point fixed with respect to the printing position. The magnet of time stamp TS is connected in multiple with stamping magnet SM as will appear shortly, and consequently when current is supplied to the stamping magnet the magnet of the time stamp is also energized and stamps on the tape the day and hour.

In describing the operation of the apparatus, I shall assume that the recording device RD occupies its initial position with motor M running, and a train traveling at 60 miles per hour approaches the section D—E, section D—E being taken to be 880 feet in length. When the leading wheel of the train enters the section and actuates device DM, relay TAM is deenergized and immediately released. The closing of back contacts 3 and 21 of relay TAM causes current to be supplied to both relays TBM and TAS and these relays are picked up, relay TBM being picked up during the slow pick-up period of relay TAS. Relay TBM once picked up is retained energized by its stick circuit after relay TAS is picked up. The picking up of relay TBM to close front contact 22 energizes control relay TBMA since check contact 77—76 of device RD is closed at the initial position of the recording device. Relay TBMA on picking up to close front contact 81 completes an obvious circuit for clutch magnet CM and the clutch magnet is energized to connect motor M to the printing wheel PW to start a movement of the wheel. An indication lamp 82 is preferably connected in multiple with magnet CM and is illuminated as an indication of the active condition of the recording device. The picking up of relay TBMA also closes front contact 83 to complete an obvious circuit from magnet RM and that magnet is energized to advance tape TP and inked ribbon 61 one space.

This train traveling at 60 miles per hour reaches the exit end of section D—E in ten seconds. Wheel PW is advanced ten spaces in ten seconds, and hence the numeral 60 is brought to the printing position at the time the leading wheel of the train reaches device EM to actuate this device and cause relay TBM to be deenergized. Relay TBM is now released to deenergize in turn the control relay TBMA and that relay is also released. Since contact 77—54 of the recording device is closed as soon as the printing wheel moves away from its initial position, current flows from terminal B through winding of magnet SM, continuity transfer contact 84—85 of relay TBMA closed momentarily during the release of this relay, and contact 77—54 to terminal C; and magnet SM is energized to press tape TP into printing engagement with the numeral 60 of wheel PW. The magnet of time stamp TS is also energized during the same interval that magnet SM is energized, and time stamp TS is actuated to print on the tape the date which serves to identify the train whose speed is now recorded on the tape. Release of relay TBMA to open front contact 81 causes clutch magnet CM to be deenergized and the clutch CL is disengaged so that the printing wheel PW is returned from the position to which it had advanced back to its initial position due to the force of bias spring 80.

If the train is relatively short, that is, shorter than section D—E, relay TAM does not pick up when the rear of the train passes beyond device DM because its pick-up circuit is held open at back contact 7 of relay TBM, which latter relay is now picked up. When the head end of the train encounters device EM and deenergizes relay TBM, relay TAM is energized and picked up. Relay TAS is now deenergized and releases at the end of its slow release period. Hence when this train vacates the section, the apparatus is at its normal position ready for operation by a second train.

If the train is relatively long, that is, longer than the section D—E, there is a period during which both devices DM and EM are actuated by the train and both relays TAM and TBM are released. When the rear of this relatively long train passes contact device DM, the relay TAM is reenergized through its pick-up circuit and then is retained energized by its stick circuit. Relay TAS is made slow to release to avoid its release between trucks of a long train when such long train is moving at a slow speed and the contact of device DM is closed between trucks for an interval sufficient for relay TAM to be picked up. With relay TAS thus retained energized and picked up, the circuit for relay TBM is not reestablished during such momentary closing of the contact of device DM.

It is to be noted that relay TBMA cannot be energized in response to operation of track instrument DM by a train and an operation of the recording device initiated, unless the printing wheel PW occupies its initial position to close check contact 77—76. Also stamping magnet SM and the time stamp magnet are not energized during the interval relay TBMA is being picked up because the circuits for the stamping magnet and time stamp magnet are held open at contact 77—54.

It is apparent from the foregoing description of the operation of the apparatus for the train traveling at 60 miles per hour that the apparatus operates in a similar manner for a train traveling at some other speed between 60 and 10 miles per hour, except the recording device is operated for a time interval equal to that required for the train to travel the section D—E and the corresponding miles per hour numeral is brought to the printing position and a corresponding record made upon the tape.

I shall next assume that a train moving at a very slow speed, that is, some speed less than 10 miles per hour, enters the section and initiates an operation of the recording device. This slow moving train consumes more than one minute in traversing the section. Consequently the printing wheel is rotated to its extreme position some time prior to the operation of device EM and the subsequent release of the control relay TBMA to deenergize the clutch magnet and discontinue the rotation of the printing wheel. Just prior to the wheel reaching its extreme position the pin 52 actuates cutout contact 18—55 and relays TBM and TBMA are both deenergized to stop operation of the recording device, the minimum speed numeral 10 being printed on the tape. The test key K is provided for manual testing of the apparatus.

It is to be understood that while a given length of section D—E and a given time of operation of the printing wheel have been assumed, and a given set of miles per hour numerals disclosed, the invention is not limited thereto and other values for the different features can be used.

Apparatus here disclosed has the advantages that a permanent record of the speed of trains is automatically recorded and printed in a manner and in a form that can be immediately and accurately read at some subsequent time by an operator or any other interested party, without calculation or reference to a table or chart.

Although I have herein shown and described only one form of speed measuring and recording apparatus embodying my invention, it is understood that various changes and modifications may be made therein within the scope of the appended claims without departing from the spirit and scope of my invention.

Having thus described my invention, what I claim is:

1. In recording apparatus for use with a trackway over which objects move at different speeds and which trackway is provided with two object actuated contact devices spaced a preselected distance apart to control successively a first and a second control circuit in response to an object moving between said devices; the combination comprising, a printing wheel biased to an initial position and operable a predetermined portion of a revolution to an extreme position, a continuously running constant speed motor, means including a magnet operated clutch and a drive mechanism to at times connect said motor to said wheel to operate the wheel to its extreme position, said motor and drive mechanism proportioned for operating said wheel to its extreme position in a time interval equal to that consumed by an object in moving between said two contact devices at a preselected minimum speed, a series of miles per hour speed numerals formed on the outer surface of said wheel, said series arranged with respect to the rate at which said wheel is driven by said motor that each numeral appears at a preselected printing position in a time interval equal to that consumed by an object in moving between said contact devices at the speed corresponding to that numeral, a tape adjacent said wheel at said printing position, a magnet operated stamping device operable to press said tape into printing engagement with the speed numeral occupying said printing position, and said clutch magnet disposed to be governed by said first circuit and said stamping device magnet disposed to be governed by said second circuit.

2. In recording apparatus for use with a trackway over which objects move at different speeds and which trackway is provided with two object actuated contact devices spaced a preselected distance apart to control successively a first and a second control circuit in response to an object moving between said devices, the combination comprising, a plurality of speed unit characters formed on an element in a series that starts with a maximum speed unit character and decreases to a minimum speed unit character, said element biased to an initial position and operable to an extreme position to move said speed unit characters to a given position one at a time; motor means including an electric motor, an electromagnetic clutch and a drive mechanism associated with said element to operate the element to its extreme position at preselected rate; said motor continuously running and said clutch normally deenergized, a tape adjacent said element at said given position, stamping means including a magnet operable to stamp said tape into printing engagement with the speed unit character at said given position, said speed unit characters spaced on said element in such a manner that when the element is operated by said motor means each character is brought to said given position in the time interval consumed by an object in moving between said contact devices at a speed corresponding to that character, and the magnet of said clutch connected to said first control circuit and the magnet of said stamping means connected to said second control circuit.

ARCHIBALD M. CRAWFORD.